(12) United States Patent
Shakarchi

(10) Patent No.: US 11,185,393 B2
(45) Date of Patent: Nov. 30, 2021

(54) DENTAL IMPLANT FOR IMPLANTATION FACILITATION AND STABILIZATION

(71) Applicant: Alpha Bio Tec. Ltd., Petach Tikva (IL)

(72) Inventor: Kobi Shakarchi, Petach Tikva (IL)

(73) Assignee: ALPHA BIO TEC. LTD., Petach Tikva (IL)

( * ) Notice: Subject to any disclaimer, the term of this patent is extended or adjusted under 35 U.S.C. 154(b) by 368 days.

(21) Appl. No.: 15/548,403

(22) PCT Filed: Feb. 5, 2016

(86) PCT No.: PCT/IL2016/050136
§ 371 (c)(1),
(2) Date: Aug. 2, 2017

(87) PCT Pub. No.: WO2016/125171
PCT Pub. Date: Aug. 11, 2016

(65) Prior Publication Data
US 2018/0036102 A1 Feb. 8, 2018

(30) Foreign Application Priority Data
Feb. 5, 2015 (IL) .......................................... 237117

(51) Int. Cl.
*A61C 8/00* (2006.01)

(52) U.S. Cl.
CPC ............ *A61C 8/0025* (2013.01); *A61C 8/006* (2013.01); *A61C 8/0092* (2013.01)

(58) Field of Classification Search
CPC ... A61C 8/006; A61C 8/0025; A61C 8/00092; A61C 8/0018; A61C 8/0019; A61C 8/0021; A61C 8/0022; A61C 8/0024; A61B 17/864; A61B 17/8625; A61B 17/8635

USPC ......................................................... 433/174
See application file for complete search history.

(56) References Cited

U.S. PATENT DOCUMENTS

| 6,743,233 B1 * | 6/2004 | Baldwin ............ A61B 17/0401 606/232 |
| 7,281,925 B2 * | 10/2007 | Hall ..................... A61C 8/0022 411/411 |
| 7,806,693 B2 * | 10/2010 | Hurson ................ A61C 8/0022 433/174 |
| 8,535,358 B2 * | 9/2013 | Willert .................. B23G 9/001 606/309 |

(Continued)

FOREIGN PATENT DOCUMENTS

EP   2 332 489     6/2011
JP   H01 64847     4/1989

(Continued)

OTHER PUBLICATIONS

May 10, 2016 International Search Report for International Application No. PCT/IL2016/050136 filed on Feb. 5, 2015.

*Primary Examiner* — Edward Moran
*Assistant Examiner* — Matthew P Saunders
(74) *Attorney, Agent, or Firm* — Knobbe, Martens, Olson & Bear, LLP

(57) ABSTRACT

A bone implant and in particular a dental implant having an apical end configured to facilitate placement and stabilization within an implantation site, wherein the distal end of said apical end has a contoured surface, and the apical surface of said apical end has at least one apical surface recess extending toward the coronal part of the implant.

24 Claims, 6 Drawing Sheets

(56) References Cited

U.S. PATENT DOCUMENTS

| | | | |
|---|---|---|---|
| 9,782,209 B2* | 10/2017 | Reed | A61B 17/8625 |
| 2005/0119758 A1* | 6/2005 | Alexander | A61C 8/0006 623/23.5 |
| 2006/0217727 A1* | 9/2006 | Munro | A61B 17/74 606/312 |
| 2008/0261175 A1* | 10/2008 | Hurson | A61C 8/0022 433/173 |
| 2009/0305189 A1* | 12/2009 | Scortecci | A61C 8/0022 433/165 |
| 2010/0240010 A1* | 9/2010 | Holmstrom | A61C 8/0022 433/174 |
| 2011/0045437 A1* | 2/2011 | Ami | A61C 8/0022 433/174 |
| 2012/0172935 A1* | 7/2012 | Willert | A61B 17/8625 606/309 |
| 2013/0022942 A1 | 1/2013 | Zadeh | |
| 2013/0216976 A1 | 8/2013 | Ihde | |
| 2014/0023990 A1 | 1/2014 | Zadeh | |
| 2014/0058460 A1* | 2/2014 | Reed | A61B 17/8625 606/312 |
| 2014/0094859 A1* | 4/2014 | Reed | A61B 17/8625 606/312 |
| 2014/0329202 A1* | 11/2014 | Zadeh | A61C 8/0068 433/174 |
| 2015/0127057 A1* | 5/2015 | Ganey | A61B 17/7098 606/309 |
| 2015/0230844 A1* | 8/2015 | Ellis | A61B 17/8635 606/316 |
| 2018/0146987 A1* | 5/2018 | Corbin | A61B 17/86 |
| 2019/0290402 A1* | 9/2019 | Djemai | A61K 6/822 |

FOREIGN PATENT DOCUMENTS

| | | |
|---|---|---|
| WO | WO 2010/021478 | 2/2010 |
| WO | WO 2013/088385 | 6/2013 |
| WO | WO 2015/118543 | 8/2015 |
| WO | WO 2016/125171 | 8/2016 |

* cited by examiner

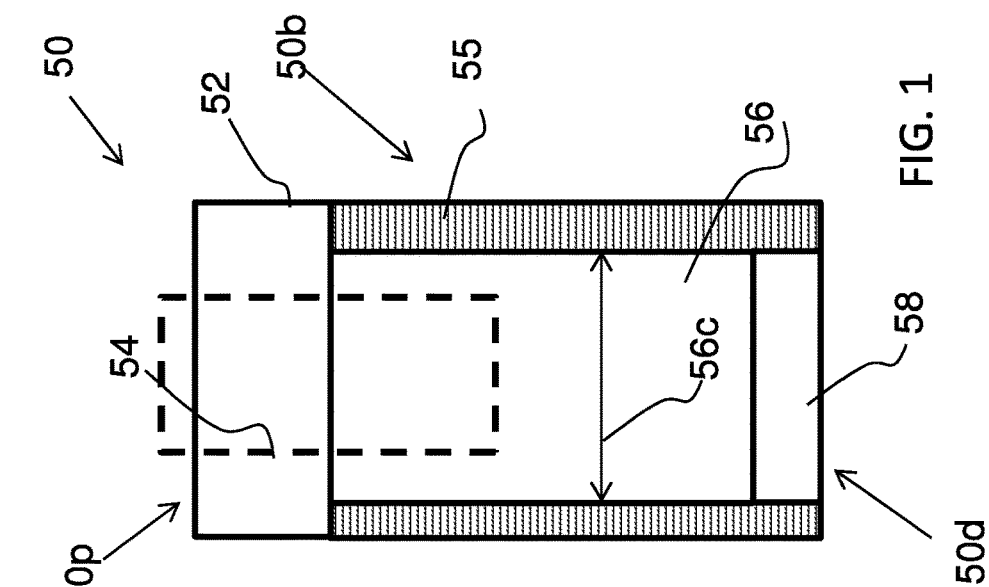
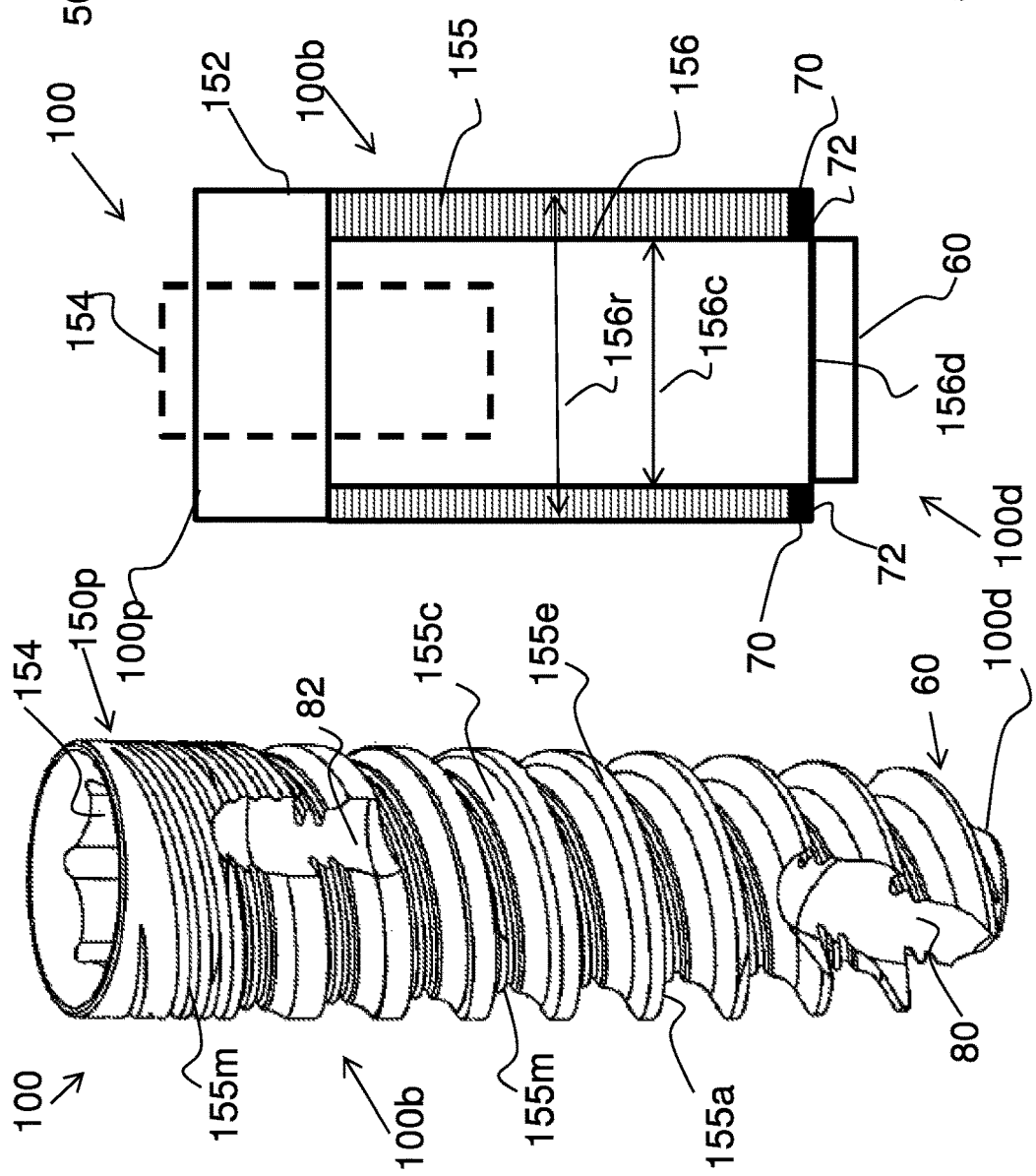

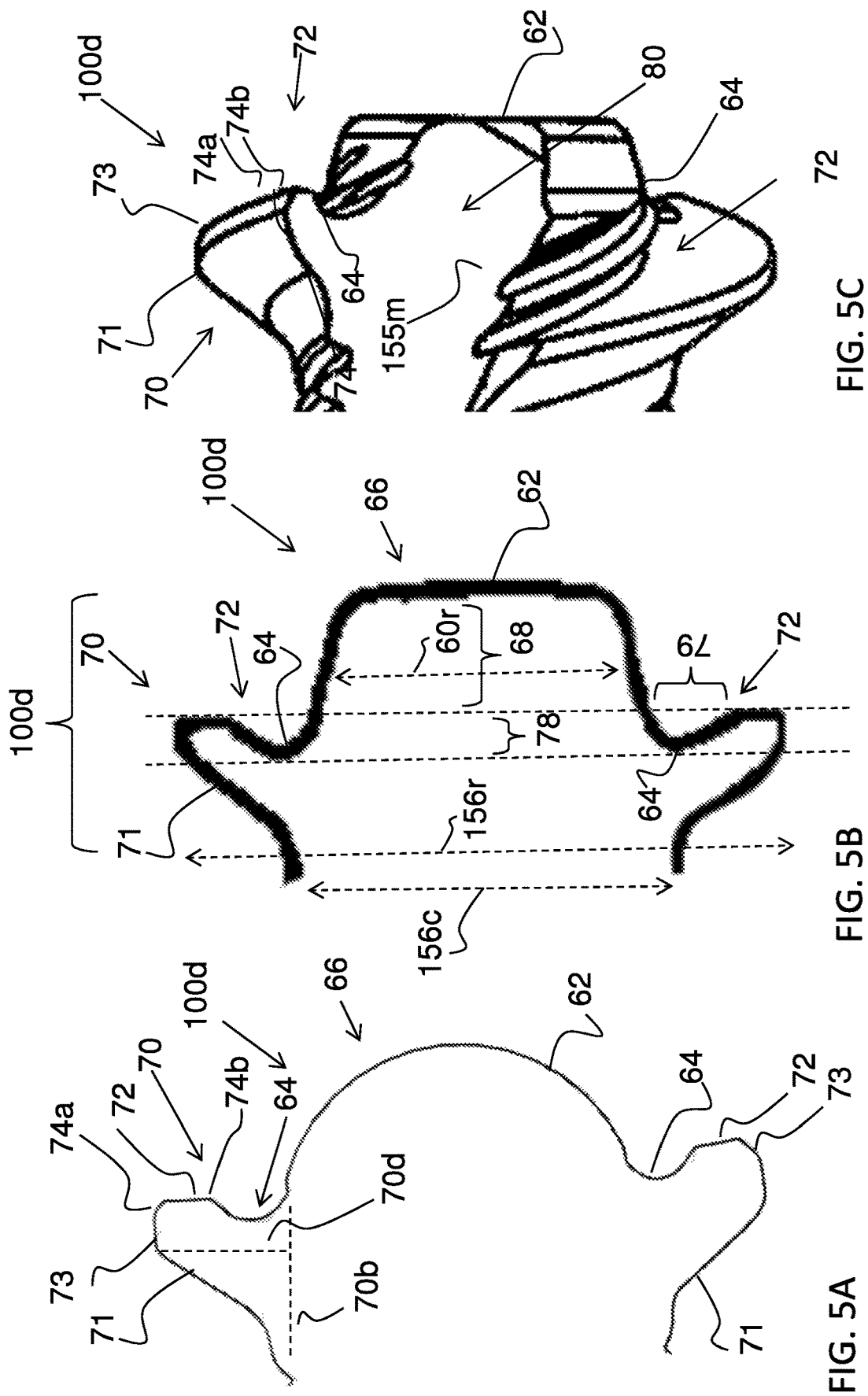

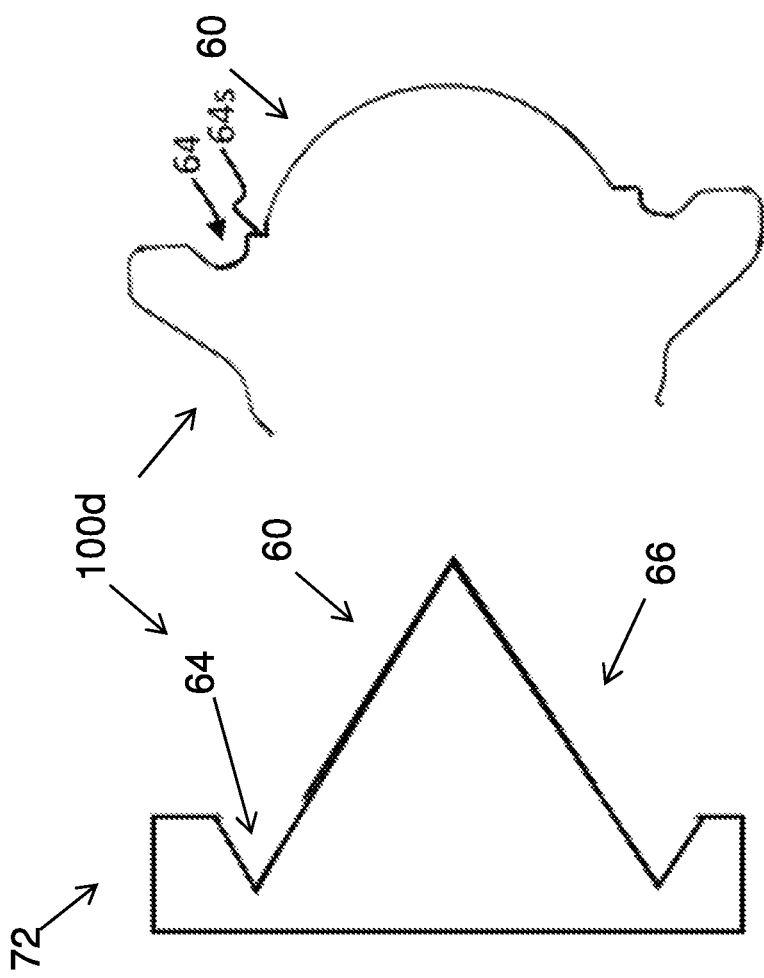
FIG. 5D
FIG. 5F
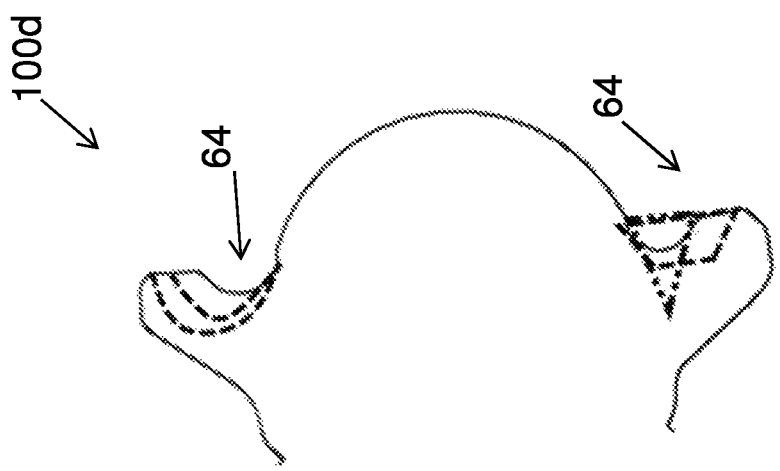
FIG. 5E

DENTAL IMPLANT FOR IMPLANTATION FACILITATION AND STABILIZATION

CROSS-REFERENCE TO RELATED APPLICATIONS

This application is a national stage application under 35 U.S.C. § 371 of International Application No. PCT/IL2016/050136, filed on Feb. 5, 2016, which published in English as WO 2016/125171 A1 on Aug. 11, 2016 and which claims priority benefit of Israeli Patent Application No. 237117 filed on Feb. 5, 2015.

FIELD OF THE INVENTION

The present invention relates to a bone implant and in particular, to a dental implant having an apical end configured to facilitate placement and stabilization within an implantation site.

BACKGROUND OF THE INVENTION

A dental restoration assembly is provided to replace lost teeth within the oral cavity. The implant assembly include various parts that come together to form a structure that replaces a tooth providing both esthetic and functional purposes.

The dental restoration assembly generally includes a crown to replace the crown portion of the lost tooth, a dental implant (anchor) in place of lost tooth root, where the crown and implant are coupled with one another with an abutment. All three parts function together to bring about a successful implant procedure. The implant portion of the dental restoration assembly provides the primary base and support structure for the assembly and is therefore a central to the success of the procedure.

The dental implant is generally provided in a screw-form that generally includes a coronal portion, body portion, an apical portion and a connection platform. The connection platform of the implant facilitates coupling to other implant structures for example dental tools, abutments, crowns, as well as other structures. The coronal, body and apical segments are provided for facilitating into and integrating with the bone (Osseointegration) at the implantation site.

The implant body and apical portion has various designs according to many parameters including the bone type to be implanted, the location in which the implantation is to occur (implantation site). The body portion includes a core from which extends threading along its length. The threading is used to securely introduce the implant into the bone and allows for the implant to integrate with the bone.

Despite the advancement in implant design there is a continuing need to improve a dental implant's ability to be seamlessly placed at the implantation site.

SUMMARY OF THE INVENTION

The present invention provides a dental implant having an apical end that is configured to facilitate quick placement, initial seating, centralizing and stabilization of the implant within an implantation site.

Accordingly embodiments of the present invention provide a distal end that is formed from the leading and centralizing element, provided in the form of the apical end portion having a small diameter relative to the primary threads that are wider therein providing the implant stability at the implantation site.

The apical end according to the present invention provides for quick placement, initial seating, centralizing and stabilization of insertion of the implant at the implantation site, in that the implant's apical end is provided with a smaller diameter than that of the implant's core portion, therein providing an elements that accounts for quick placement balancing and centralizing at the implantation site surface.

The apical end is further configured to be continuous with the primary threads disposed at the distal end of the implant body. The primary threads are characterized in that the thread's apical surface features a contoured surface that is configured to be continuous with the external surface of the apical end. The contoured surface provides a wide base used to balance the implant while along the implantation site surface. Preferably the contoured surface comprises at least one or more recess to account for an uneven implantation site surface. Preferably the contoured surface further defines a gripping surface defined between at least two gripping tips that provide for the implant's initial seating at the implantation site surface.

Most preferably initial seating and stabilization of the implant at the implantation site is provided along at least two surfaces selected from the gripping surface, the primary thread apical surface recesses, and the narrow apical end. Therefore the implant of the present invention provides initial seating and stability at the implantation site at the bone level surface or within a drill site borehole or extraction site.

Most preferably when the implantation site is a drill site borehole, the borehole should be configured to have a diameter limited by the diameter of the implant's apical end such that the drill site diameter should be smaller than the outer diameter of the primary thread. Similarly the implantation site borehole diameter should be slightly larger than the diameter of the apical end, so as to allow the apical end to seat with the borehole. Accordingly embodiments of the present invention provide a dental implant having an apical end that allows for minimizing the implantation site borehole drilling diameter.

Embodiments of the present invention provide a screw-form bone implant for implanting at an implantation site comprising a coronal portion, a medial portion and an apical portion that are continuous with one another, the coronal portion defining a proximal end of the implant and the apical portion defining a distal end wherein the medial portion may be disposed between the coronal portion and apical portion of the implant; the implant featuring threading having at least one start and at least one connection platform the implant characterized in that the distal end features a contoured surface that may be configured to facilitate immediate placement, seating, centralization and stabilization of implant within the implantation site, the contoured surface may be a continuous surface having a narrow head defined by the external surface of the apical portion and wide base portion defined by the apical surface of the primary thread; wherein the apical portion may be configured to have an external diameter that is smaller than the external diameter of the medial portion, and defining an external surface; and wherein the primary thread having an apical surface, a coronal surface and a lateral edge connecting them, the apical surface featuring at least one apical surface recess defined along the apical surface defining a length and extending proximally toward the coronal surface defining depth.

Optionally the apical surface of the primary thread features at least two apical surface recesses.

Optionally the apical surface recess may be disposed adjacent to external surface of the apical portion.

Optionally the at least two apical surface recess are co-planar and having the same dimensions.

Optionally the contoured surface may be a sigmoidal surface formed along a medial plane.

Optionally the apical surface recesses are configured to be concave.

Optionally the apical surface recess may be provided with a profile in any geometric shape for example including but not limited to from the group comprising: ellipsoid, concave, ovoid, polygonal of n sides wherein n is at least 2.

Optionally the apical portion may be further configured to have a depth from about 0.1 mm up to about 5 mm.

Optionally the apical end may be configured to have a diameter from about 0.5 mm up to about 5 mm.

Optionally the recess may be configured to have a depth from about 0.05 mm up to about 1 mm.

Optionally the recess may be configured to have a length from about 0.05 mm.

Optionally the length may be configured to be up the size determined by the depth of primary thread.

Optionally the apical surface may be configured to have a curved gripping surface forming cutting edge defined between at least two gripping tips.

Optionally the distal end may further comprise at least one flute. Optionally the distal end flute may extend apically toward the proximal end of the implant and may cover any portion of the implant body.

Optionally the distal end may further comprise at least two or more flutes.

Optionally the apical portion depth may be configured to facilitate sinus lifting procedures wherein the apical portion may be configured to have a length of about 0.4 mm up to about 5 mm.

Optionally the apical portion may be configured to assume a shape that may for example include but is not limited to the group consisting of: trapezoidal, ball, curved, ovoid, ellipsoid, pyramid, conical, polygonal having n sides wherein n is at least 2 (n>2).

Optionally the apical portion may further features microthreads.

Within the context of this application the term "primary thread" and/or "leading thread" refers to the first thread that defines the initial and/or start location of the dental implant threading. Such a primary thread is generally adjacent to the distal end and/or apical end of the implant, and may therefore be interchangeably referred to as the "apical end thread" and/or "starting thread".

Within the context of this application the term thread, threading or "threading portion" refers to a portion of an implant comprising threading and utilized for integrating and/or interfacing and/or securely coupling the implant structure within the bone facilitating implantation within the bone.

Within the context of this application the term "flute" may be interchangeable with any of the terms including but not limited to vents, grooves, recess or the like terms according to the art to refer to a portion of an implant provided with a cutting edge for tapping function, gathering function or the like.

Within the context of this application the term "proximal" generally refers to the side or end of an elongated medical device such as an implant that is intended to be closer to the performing medical personnel and/or practitioner. The term "proximal" may be interchangeable with the term "coronal" when referring to the coronal side of an implant.

Within the context of this application the term "distal" generally refers to the side or end of an elongated medical device such as an implant that is opposite the "proximal end", and is farther from the performing medical personnel and/or practitioner. The term "distal" may be interchangeable with the term "apical" when referring to the apical side of an implant.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematic block diagram of an a standard dental bone implants;

FIG. 2 is a schematic block diagram of a dental bone implant according to embodiments of the present invention;

FIG. 3 is a schematic illustrative of a dental bone implant according to embodiments of the present invention;

FIG. 5A-F show a side view along a medial plane of the distal end of a dental bone implant according to embodiments of the present invention.

DESCRIPTION OF THE PREFERRED EMBODIMENTS

Figure 4A:
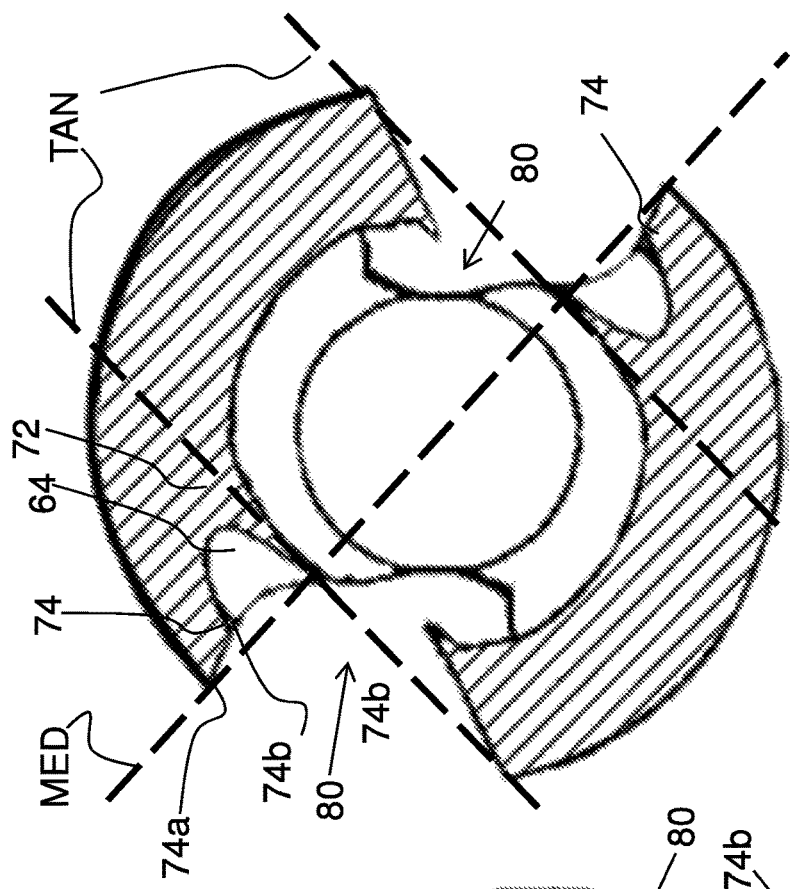
FIG. 4A-B show an end view of the distal end of a dental bone implant according to embodiments of the present invention.

The present invention provides a dental implant having an apical end that is configured to facilitate quick placement and initial seating within an implantation site borehole while stabilizing the implant's insertion.

The principles and operation of the present invention may be better understood with reference to the drawings and the accompanying description. The following figure reference labels are used throughout the description to refer to similarly functioning components are used throughout the specification herein below.

5 bone level;
10 borehole implantation site;
15 extraction site;

16 extraction implantation site;
50 dental implant;
50p proximal end;
50d distal end;
50b implant body;
52,152 coronal portion;
54,154 connection platform;
55,155 primary threading;
55a thread apical surface;
55b thread base;
55c thread coronal surface;
55d thread depth;
55e thread lateral edge;
55m micro-thread;
55b thread base;
56, 156 medial portion;
56c medial portion inner core;
56d, 156d medial portion distal end;
156r medial portion external diameter;
156c medial portion core/internal diameter;
58 apical end;
60 apical end;
60r apical end diameter;
62 external surface;
64 apical surface recess;
66 distal end contoured continuous surface;
68 apical portion depth;
70 primary threads;
70d primary thread, thread depth;
70b primary thread, thread base;
71 primary thread, thread coronal surface;
72 leading thread, thread apical surface;
73 primary thread, thread lateral edge;
74 apical surface gripping face;
74a,b gripping tips;
78 depth of concave recess;
79 length of concave surface;
80 flutes;
82 coronal flutes;
100 implant;
100p proximal end;
100d distal end;
156r medial portion core radius;

FIG. 1 shows a schematic block diagram of a standard dental implant 50 as is known in the art having a substantially cylindrical and/or conical body 50b between a proximal end 50p and a distal end 50d. The body 50b may be divided into various functional portions including: a coronal portion 52, a connection platform 54, medial portion 56, and an apical end 58. The external surface of the implant body 50b is preferably fit with threading 55 that may be optionally cylindrical, and provided for integrating and coupling the implant with the bone. Threading 55 may be dispersed along the length of the body, along any one of or all of the implant's functional portions, for example including but not limited to the coronal, medial and apical. The threading may be dispersed in any manner along the implant body 50b.

Threading 55 may be generally described as extending from the implant body 50 at a base 55b and having an apical surface 55a, a coronal surface 55c, the two surfaces are coupled over a lateral edge 55e. The distance between the base 55b and lateral edge 55e define the thread depth 55d. The thread may be configured along these surfaces to provide threading 55 with specific functionality relative to an application of the implant. Threading 55 may also feature flutes.

The connection platform 54 provides for coupling the implant to an implant abutment (not shown) and/or a crown (not shown) or the like dental implant structures. The connection platform 54 may be configured to be an internal connection platform or an external connection platform, as is known in the art. Optionally platform 54 may further provide a tooling interface that provides for allowing an implant to couple with tools for manipulating the implant, optionally the tooling interface may be provided in the form of an internal hex or the like anti-rotation interface.

FIG. 2 shows a schematic block diagram of a dental bone implant 100 according to embodiments of the present invention, implant 100 is characterized by its distal end 100d featuring apical end 60, and the distal end 156d of medial portion including at least one primary thread 70 and more preferably at least two or more primary threads 70.

Implant 100 has a proximal end 100p and a distal end 100d and comprises a coronal portion 152, a connection platform and/or tooling interface 154, a medial portion 156 that includes threading 155 and apical end 60.

Figure 6A:
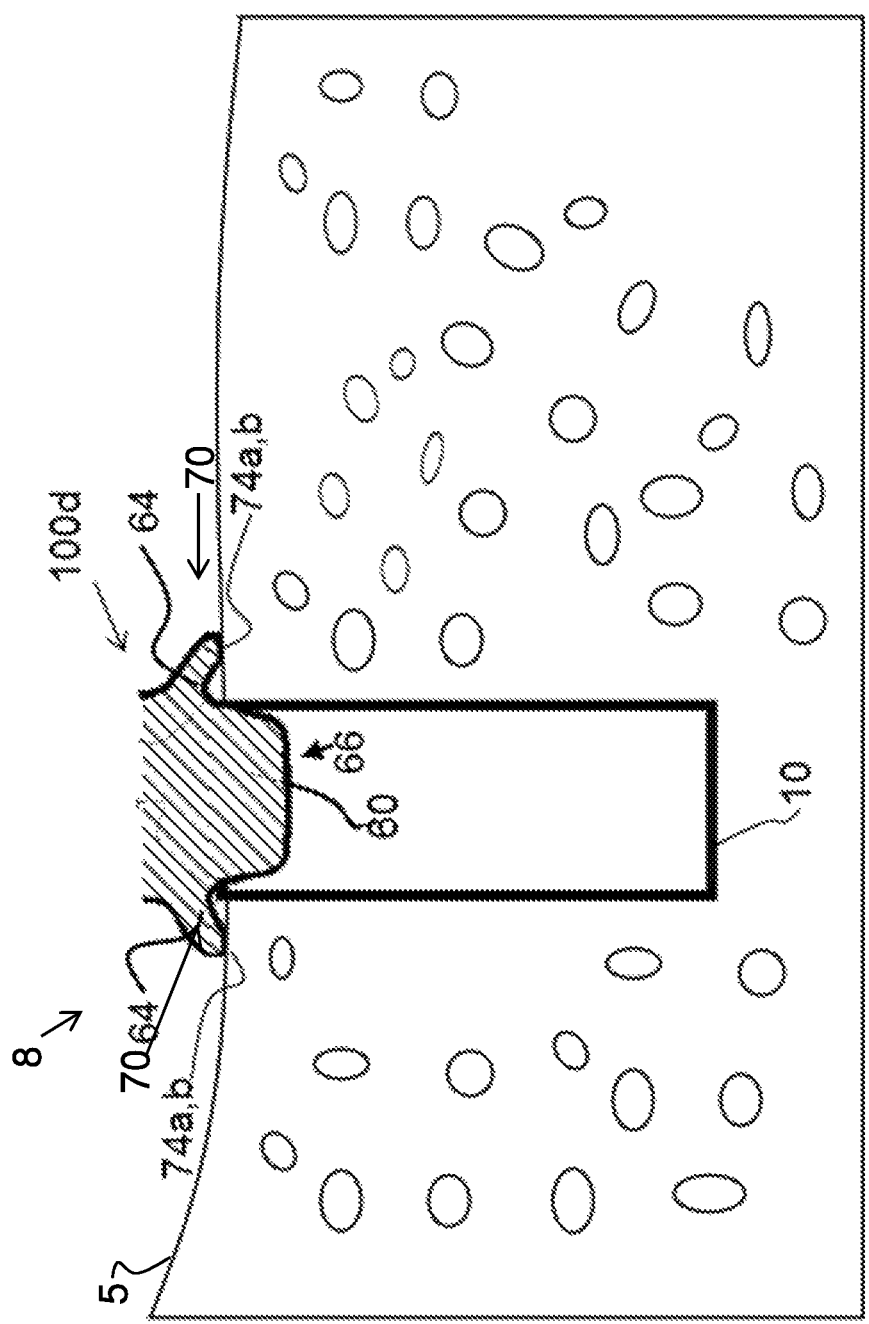
FIG. 6A-B show a schematic illustrative diagram of a dental bone implant within an implantation site according to embodiments of the present invention.
Figure 6B:
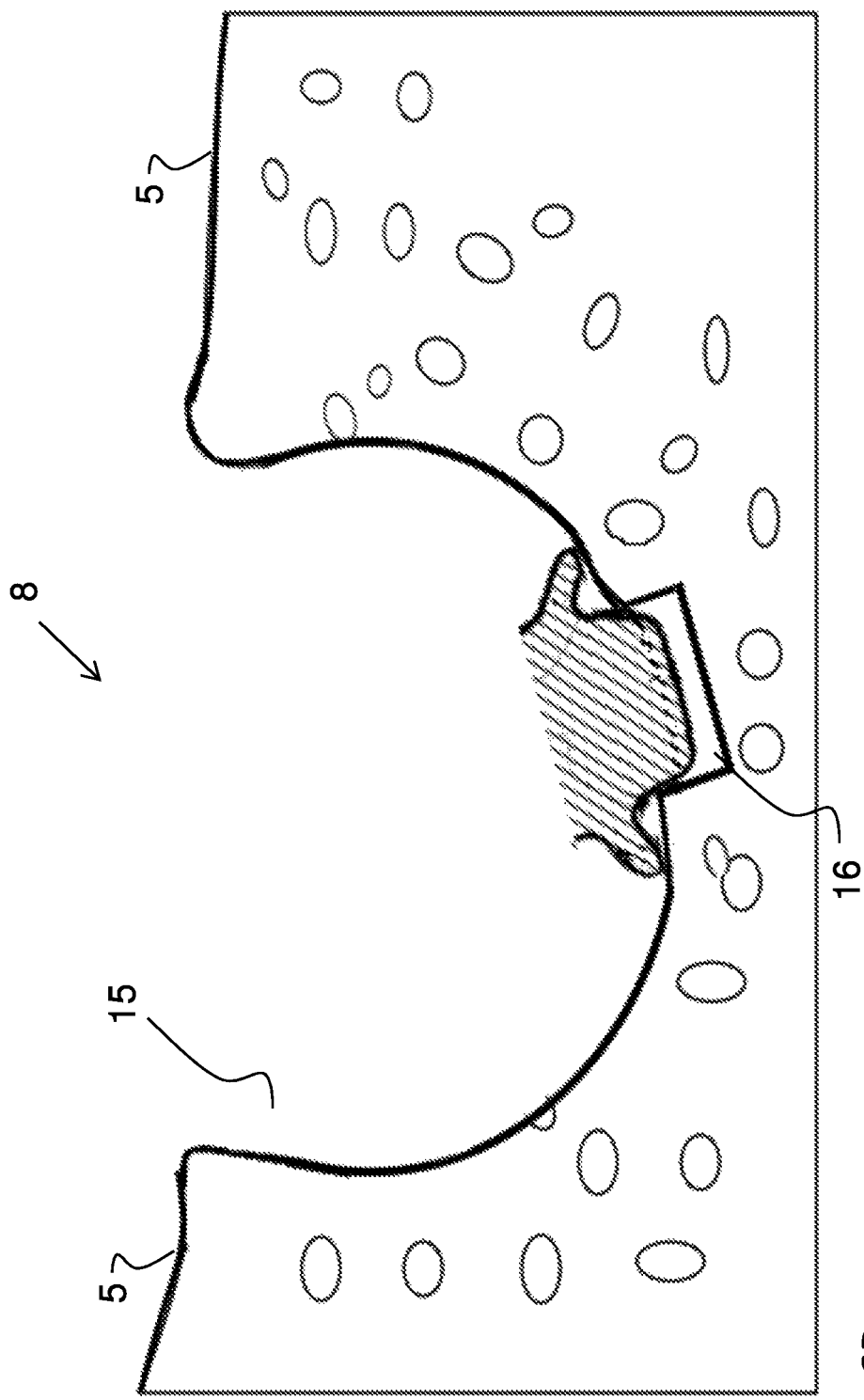

Implant 100 is characterized in that it features a distal end 100d including apical portion 60 and at least one primary thread 70 that provide for quick placement, stabilization and initial seating of implant 100 along at least one or more surfaces of an implantation site 8 for example including but not limited to: bone level 5, borehole implantation site 10, extraction site 15, extraction implantation site 16, for example as shown in FIG. 6A-B.

Most preferably distal end 100d is configured such that the apical portion 60 and the apical surface 72 of primary threads 70 form a continuous surface having a wide base defined by the primary threads 70 that tapers down to a narrow head defined by the apical portion 60, therein forming a continuous contoured surface 66, best shown in FIG. 5A-E. The contoured surface 66 allows for quick placement, stabilization and seating of implant 100 along at least one surface at an implantation site 8, selected from bone level surface 5, extraction site 15, extraction site borehole 16, and an implantation site borehole 10, for example as shown in FIG. 6A-B. Distal end 100d features apical end 60 that is provided with a smaller diameter 60d than the external diameter 156r of the medial portion 156, the smaller diameter allows for quick placement of the apical end 60 within the implantation site borehole 15, 16, 10. Preferably, the coronal diameter of apical end 60 is configured to be smaller than or equal to the distal core/internal diameter 156c of medial portion 156.

Preferably primary threads 70 comprise an apical surface 72 that is continuous with external surface 62 of apical end 60, best seen in FIG. 5A-E. At least two primary threads 70 are disposed at the distal end 156d of medial portion 156 of the implant body 100b. Most preferably each primary thread 70 comprise at least two gripping tips 74a,b that forms a gripping surface 74 disposed there between along the apical surface 72 that provide for the initial seating of implant 100 within an implantation site 10, 15, 16. Most preferably the gripping tips 74a,b and therein surface 74 are provided by introducing a recess 64 along apical surface 72.

Most preferably recess 64 further provides apical surface 72 with a contour that facilitates placement of implant 100 along the bone level surface 5, as the bone level surface is not necessarily a flat and/or even surface.

Optionally recess 64 may be located anywhere along apical surface 72.

Optionally apical surface 72 may feature at least one or more recess 64.

Optionally and preferably the number of recess 64 if configured according to and/or is a function of the number of starts disposed on the threading 155.

Optionally the number recess 64 is equal to the number of thread starts disposed on threading 155.

Preferably primary thread 70 is the distal most threading, of threading 155, provided with implant 100. Primary threading 70 is preferably configured along its apical surface 72, as will be described in greater detail. Optionally and preferably threading 155 with the exception of apical surface 72 of primary thread 70 may be configured according to individual thread parameters as is known in the art.

Optionally coronal portion 152, tooling interface and/or connection platform 154 and medial portion 156 may be configured according to individual implant parameters as is known in the art. For example connection platform 154 may be configured to be an internal or external connection platform as is known in the art. For example, the shape, dimensions and the like parameters and/or configuration of medial portion 156 and/or coronal portion 152 may be configured as is known in the art.

Optionally implant 100 may further comprise micro-threads 55*m* disposed along any portion of implant 100. Optionally each portion of implant 100 may be fit with individually configured micro-threads as is known in the art.

Optionally implant 100 further comprises at least one or more flutes 80 disposed along at least portion of distal portion 100*d*. Optionally flutes 80 may be fit along the external surface 62 of apical portion 60. Optionally at least one or more flutes 80 may extend from distal portion 100*d* and into medial portion 156 along the implant body. Optionally implant 100 may comprise at least one or more flutes 80 along the medial portion 156. Optionally implant 100 may comprise at least one or more flutes 80 that may extend along the coronal portion 152. Optionally implant 100 may comprise at least one or more flutes 80 that may be provided in any manner, continuous and/or discontinuous, along the external surface of implant 100 along any portion thereof for example including but not limited to distal portion 100*d*, apical portion 60, medial portion 156, coronal portion 152, any combination thereof. Optionally implant 100 may comprise at least one or more flutes 80 Optionally implant 100 may comprise at least one or more flutes along any portion of the implant body for example in the form of distal end flutes 80 or coronal portion flutes 82 as shown in FIG. 3, or any combination thereof.

Optionally implant 100 may comprise at least one or more flutes having any cross sectional shape and/or profile for example including but not limited to circular, oval, ovoid, trapezoidal, polygonal, triangular, polygonal having n sides wherein n is at least 3, the like or any combination thereof.

Optionally implant 100 may comprise at least one or more flutes disposed along any portion of implant 100 that may be provided in any orientation for example including but not limited to planar, angular, angled along any plane, angled along any direction, any combination thereof, the like orientation.

Optionally implant 100 may comprise at least one or more flutes disposed along any portion of implant 100 that may be provided with any contour along the length of implant 100 for example including but not limited to helical, linear, stepwise, the like or any combination thereof.

Optionally distal end 100*d* may further comprise at least one or more flutes 80. Optionally distal end 100*d* may comprise at least two flutes 80, for example as shown in FIG. 3.

FIG. 3 shows an illustrative schematic diagram of implant 100 according to the present invention. Implant 100 comprises a distal end 100*d* and a proximal end 100*p*. Implant 100 comprises an internal connection platform disposed 154 provided in the form of an internal hex, that is utilized both as a tooling interface and a coupling interface for coupling with optional implant elements (not shown) for example including but not limited to an implant abutment, crown, transfer abutments, tools or the like as is known in the art.

Implant 100 comprises a coronal portion 152, medial portion 156 and apical portion 60. Implant body 100*b* comprises primary threading 155 and micro-thread 155*m*. As shown primary threading 155 extends from implant body 100*b*, the thread having a coronal surface 155*c*, apical surface 155*a* that are linked over a lateral edge 155*e*. Optionally threading 155 may be configured to assume a plurality of optional thread parameters as is known in the art.

Optionally implant 100 may be provided with micro-thread along any portion thereof. Optionally each portion of implant 100 may feature individual micro-thread configuration. For example, the coronal portion may comprise micro-thread 155*m* that is different than that the micro-thread features along the core portion of implant 100 and/or apical end 60.

As shown implant 100 may comprise a primary thread 155 having a thread profile having at least one or more parameters selected from the group for example including but not limited to: number of starts, a pitch, angle of coronal surface 115*c*, thread depth 155*d*, the like or any combination thereof.

Optionally implant 100 may comprise at least two flutes 80 disposed along implant body adjacent to distal end 100*d* for example as shown. Most preferably distal end flutes 80 are disposed on opposing sides of implant body 100*b*.

Optionally implant 100 may further comprise at least one or more coronal portion flutes 82, for example as shown. Optionally as shown implant 100 may optional comprises two or more coronal portion flutes 82. Optionally flutes 82 may be provided in the form of a cutting flute.

Optionally implant 100 may comprise at least one or more flutes disposed along any portion thereof and disposed in any manner and/or length. Optionally such flutes may progress in any manner for example including but not limited to at least one or more selected from the group of: linear, curvilinear, helical, clockwise, counterclockwise, intermittent the like or any combination thereof. Optionally such flutes may be cutting flutes. Optionally such flutes may be arranged in any manner along implant 100.

Implant 100 includes and is characterized by the distal end 100*d*, as depicted in greater detail in FIG. 4-5, that features at least two primary threads 70 having an apical surface 72 that is continuous with the external surface 62 of apical portion therein defining a contoured continuous surface 66 at distal end 100*d*. Distal end 100*d* may optionally further comprise at least two distal portion flutes 80 that progresses proximally in a curvilinear manner along apical end 60 to a portion of distal portion of implant medial portion 156, for example as shown.

Figure 4B:
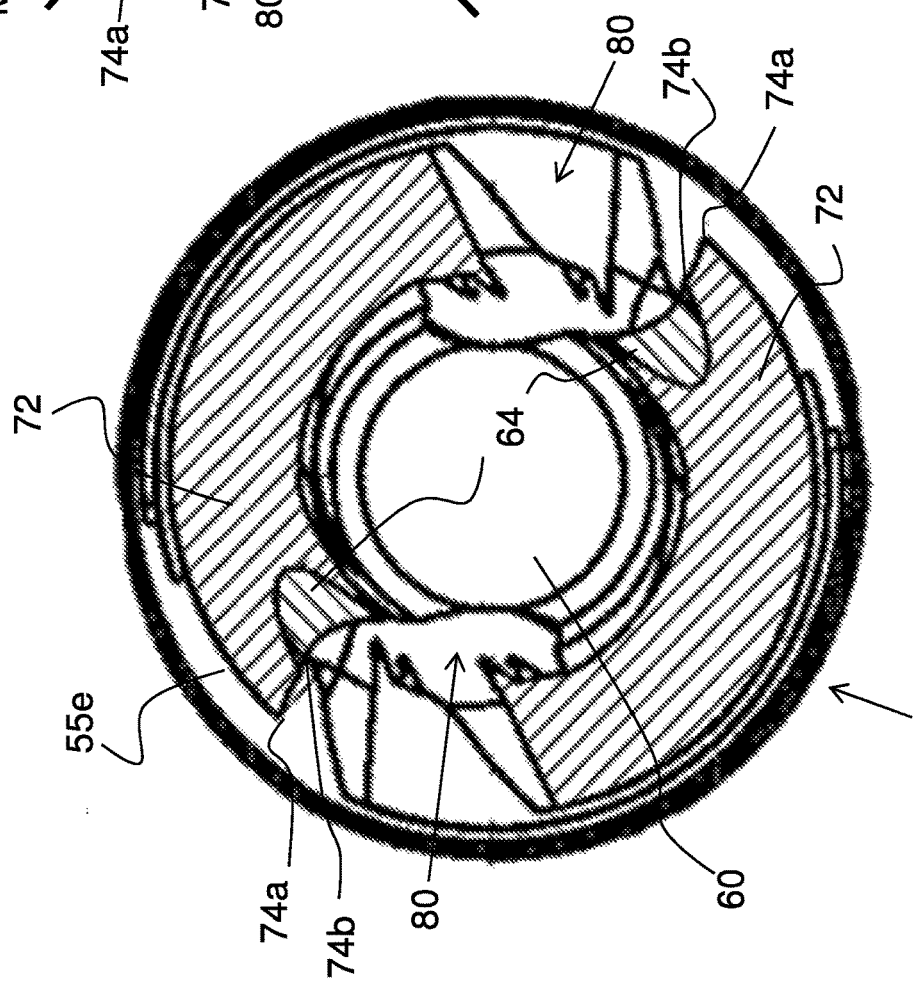

FIG. 4A-B show ends view of an optional distal end 100*d*. FIG. 4A shows distal end 100*d* of implant 100*d* while FIG. 4B shows an end view of the primary threads 70 depicting the apical surface 72.

FIG. 4A shows distal end 100*d* revealing the features of distal end 100*d* that characterize implant 100. Apical portion 60 is configured to have a smaller diameter than external diameter 156*r* of medial portion 156 and in particular distal end 156*d*, as shown in FIG. 2. Distal end 100*d* comprises at least one and more preferably at least two primary threads 70 on either side of implant 100. Primary threads 70 each have an apical surface 72 that comprises a recess 64 that define at least two gripping tips 74*a,b* forming a gripping face 74 that facilitate to grip and balance implant 100 along at least one surface in and surrounding implantation site 8 for example including but not limited to extraction site 15, bone level surface 5, extraction implantation site 16, and/or implantation site borehole 10, for example as shown in FIG. 6A-B.

Recess 64 is shown in the form of a concave curved recess 64 however recess 64 is not limited to such a configuration and may be provided in any shape along the apical surface 72, for example as shown in FIG. 5E. Optionally recess 64 may be provided in any shape that facilitates forming a recess along apical surface 72 and is progressing proximally toward the coronal surface of primary thread 70. Recess 64 may optionally be provided in a shape for example including but not limited to curved, ellipsoid, parabolic, concave, convex, quadrilateral, triangular, trapezoidal, square, polygonal of n sides wherein n is at least 2, the like or any combination thereof.

FIG. 4B shows a distal end view showing an isolated view of leading thread 70 along its apical surface 72. Most preferably gripping tips 74*a,b* formed a gripping surface 74 and recess 64.

Optionally and preferably recess 64 is disposed in a co-planar manner along at least a portion of apical surface 72 *a*, for example as shown. Optionally recess 64 are disposed apical surface 72 of each primary thread 70 and configured to be on opposite sides across a medial plane 'MED' of implant, for example as shown in FIG. 4B.

Optionally apical surface recess 64 may be disposed along the apical surface 72 adjacent to the apical portion 60 such that the external surface 62 of apical portion 60 is continuous with recess 64 and primary thread apical surface 72. Optionally recess 64 is provided adjacent to the external surface 62 of apical portion 60 along an axis ('TAN') that is tangential to the inner core 156*c* of medial portion that 156 and apical portion 60, for example as shown. Optionally recess 64 may be disposed at a distance 64*s* of up to about 0.2 mm from the outer edge of apical end core 60, for example as shown in FIG. 5D.

Curved recess 64 defines forms a bone level 5 contact surface with a shoulder of a bone borehole 10, 16, allowing the introduction of apical end 60 into the borehole 10, 16 while gripping tips 74*a,b* and gripping surface 74 associate with the tissue surrounding the borehole, borehole shoulder. Recess 64 further provides a contoured surface that is capable of associated with an uneven bone level surface 5, preferably allowing for better fitting with implantation site surface and primary thread 70 apical surface 72. Therein distal end 100*d* according to embodiments of the present invention provide an implant that provides immediate stabilization, seating of the implant within the implantation site 8 along at least one surface selected from bone level 5, borehole 10, extraction site 15, extraction site borehole 16, for example as schematically depicted in FIG. 6A-B.

Most preferably, primary threads 70 are configured to form two apically facing threads, FIG. 5A-D, that may serve as a balancing legs facilitating seating implant 100 along a bone level surface 5 for example as shown in FIG. 6A-B.

Optionally distal end 100*d* may further comprise at least one or more flutes 80 extending proximally from apical end 60, for example as shown.

FIG. 5A-B show cross sectional side views of distal end 100*d* depicted along the medial plane 'MED', shown in FIG. 4B). Different optional configuration of apical end 60 are shown, FIG. 5A shows an apical portion 60 assuming a ball shape, FIG. 5B shows an apical portion assuming a trapezoidal shape.

FIG. 5B further shows the distal end from a cross sectional side view of distal end 100*d* that includes the apical portion 60 and apical surface 72 of primary thread 70, the distal end 100*d* forming a continuous contoured surface 66, having a sigmoidal and/or sinusoidal contour, that includes the external surface of two recess 64 disposed on each of primary thread 70 and that are joined by the external surface 62 of apical section 60 to form a continuous contoured surface 66 that facilitates seating at an implantation site 8, for example as shown in FIG. 6A-B.

FIG. 5B further shows the relative dimensions of apical portion 60 having depth 68 and radius 60*r* wherein the radius 60*r* is configured to be smaller than the radius 156*r* of the proximal portion that is defined by the lateral edge 73 of primary thread 70.

Primary thread as any thread comprises an apical surface 72, a coronal surface 71 and a lateral edge 73 connecting them and defining a thread depth 70*d* and thread base 70*b*.

Optionally a borehole implantation site 10 and/or a extraction site borehole 16 are configured to have a minimal diameter that is configured according to the distal end 100*d* of implant 100.

Optionally depth 68 may be provided in optional lengths such that apical portion 60 may be shorter with a smaller depth and/or longer with a larger depth dimension. Optionally depth 68 may be provided in a longer configuration so as to facilitate sinus membrane lifting. Optionally depth 68 may be from about 0.1 mm up to about 5 mm.

Preferably a borehole 10,16 should be drilled according to the distal end 100*d* dimension wherein the borehole 10,16 should be bigger than the apical portion diameter 60*r* and smaller than the medial portion external diameter 156*r*.

Optionally apical end 60 may be configured to have a diameter 60*r* having a diameter from about 0.5 mm up to about 5 mm.

FIG. 5B further shows that the length 79 and depth 78 corresponding to the depth and length formed along apical surface 72 by the introduction of a recess 64, wherein the recess may extend coronally and/or proximally toward coronal surface 155*c* of primary thread 70.

Optionally depth 78 may be configured to be from about 0.05 mm up to about 1 mm.

Optionally length 79 may be configured to be from about 0.2 mm. Optionally length 79 may be configured to be up to size determined by the depth (70*d*) of the primary thread (70).

FIG. 5C shows a close up view of apical portion 60 of implant 100 as shown in in FIG. 3, the apical portion 60 having a trapezoidal profile and fit with flutes 80 that facilitates the formation of gripping surface 74 between gripping tips 74*a,b* with a curved recess 64. As shown apical portion 60 may optionally feature micro-threads 155*m*.

Optionally apical portion 60 may be configured to have at least one or more types of micro-thread 155*m* wherein each micro-thread is individually configured.

FIG. 5D shows a close up view similar to that depicted in FIG. 5A-B however further showing that recess 64 may be configured to start at a distance 64*s* of up to about 0.2 mm from the edge apical portion core 60 along the primary thread apical surface 72, for example as shown.

FIG. 5E shows a close up view similar to that depicted in FIG. 5A however further showing that recess 64 may be configured to have any shape and variable dimension as shown by the dotted line representing different configurations.

FIG. 5F shows a close up view of a further optional configuration of distal end 100d wherein apical end 60 and recess 64 are provided with a polygonal profiles, therein providing a contoured surface 66.

As previously described FIG. 6A-B show the use of implant 100 and in particular distal end 100d in the implantation process having a contoured surface 66 formed along the external surface of distal end 100d of implant 100. Preferably contoured surface 66 allows for the stabilization and seating of implant 100 at and adjacent to the implantation site 8 for example the bone level 5, extraction site 15, extraction site borehole 16 and/or borehole 10.

FIG. 6A shows borehole 10 that is drilled so as to receive distal end 100d, borehole 10 is preferably sized according to the dimensions of distal end 100d where most preferably borehole 10 diameter is configured to be larger than diameter 60d of apical end 60 and smaller than the external diameter 156r of medial portion 156. As shown, preferably a recess 64 is disposed on each of the primary threads 70, wherein the recess 64 are configured to be co-planar so that they seat along the shoulder of borehole 10 at bone level 5, therein enabling apical end 60 to be introduced into the borehole lumen while allowing gripping surface 74 disposed between gripping tips 74a,b disposed on each of primary thread 70 are provided stabilize implant 100 along bone level surface 5 in and around borehole 10 prior to fully introducing and tooling implant 100 into the implantation site.

FIG. 6B shows a further optional use of implant 100 having a distal end 100d according to embodiments of the present invention, where the implantation site 8 is shown in the form of an extraction site 15. The distal end 100d and in particular contoured surfaced 66 is configured so as to allow immediate seating, stabilization and integration within an extraction site 15 along any of the extraction site surface.

Optionally a short extraction site borehole 16 may be drilled so as to receive distal end 100d of implant 100, for example a shown, therein allowing for immediate seating and stability of the implant within the extraction site. Accordingly the continuous contoured surface 66 of the distal end 100d according to the present invention facilitates the placement of implant 100 in the correct location and orientation within an extraction site 15.

As shown in FIG. 6A-B an implantation site 8 may be drilled site borehole 10, 16, that is configured to have a diameter limited by the diameter of the implant 100 distal end 100d such that the drill site diameter should be smaller than the outer diameter 156r of the primary thread 70 and slightly larger than diameter 60r of the apical end, so as to allow the distal end 100d to seat within the borehole 10, 16, for example as shown. Accordingly embodiments of the present invention provide a dental implant having a distal end 100d that allows for minimizing the implantation site borehole drilling diameter.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention defined by the appended claims.

While the invention has been described with respect to a limited number of embodiment, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not described to limit the invention to the exact construction and operation shown and described and accordingly, all suitable modifications and equivalents may be resorted to, falling within the scope of the invention.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

Section headings are used herein to ease understanding of the specification and should not be construed as necessarily limiting.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

While the invention has been described with respect to a limited number of embodiments, it will be appreciated that many variations, modifications and other applications of the invention may be made.

The invention claimed is:

1. A screw-form bone implant for implanting at an implantation site comprising a coronal portion, a medial portion and an apical portion that are continuous with one another, the coronal portion defining a proximal end of the implant, the apical portion defining a distal end, wherein the medial portion is disposed between said coronal portion and said apical portion of said implant; said implant featuring a primary thread having at least one start, and at least one connection platform, the implant characterized in that said distal end comprises a contoured surface that is configured to facilitate immediate placement, seating, centralizing and stabilization of implant with the implantation site, said contoured surface is a continuous surface having a narrow head defined by an external surface of said apical portion and a wide base portion defined by, the primary thread;

a) wherein said apical portion is configured to have an external diameter that is smaller than the external diameter of said medial portion, and defining an external surface; and b) wherein said primary thread comprises an apical surface, a coronal surface and a lateral edge connecting them, a distal-face portion of the apical surface extending circumferentially about a longitudinal axis of said implant from a flute that forms a cutting edge, an apical surface recess defined along said distal-face portion defining a length and extending proximally toward said coronal surface defining a depth, wherein said apical surface recess originates from the flute that forms a cutting edge and terminates on the distal-face portion, wherein a portion of the apical surface lies between said apical surface recess and the lateral edge of said primary thread and adjacent to the cutting edge.

2. The implant of claim 1, wherein the apical surface of said primary thread features two apical surface recesses and wherein said primary thread features a double start.

3. The implant of claim 1, wherein said apical surface recess is disposed adjacent to said external surface of said apical portion.

4. The implant of claim 2, wherein said two apical surface recesses are co-planar and have the same dimensions.

5. The implant of claim 4, wherein said contoured surface is a sigmoidal surface formed along a medial plane.

6. The implant of claim 2, wherein each of said two apical surface recesses is configured to be concave.

7. The implant of claim 2, wherein each of said two apical surface recesses may be provided with a profile in any geometric shape selected from the group consisting of: ellipsoid, concave, ovoid, polygonal of n sides wherein n is at least 2.

8. The implant of claim 1, wherein said apical portion is further configured to have a depth from about 0.1 mm up to about 5 mm.

9. The implant of claim 1, wherein said distal end of said apical portion is configured to have a diameter from about 0.5 mm up to about 5 mm.

10. The implant of claim 1, wherein said apical surface recess is configured to have a depth from about 0.05 mm up to about 1 mm.

11. The implant of claim 10, wherein said length is no greater than a depth of the primary thread.

12. The implant of claim 1, wherein the apical surface is configured to have a curved gripping surface forming a cutting edge defined between at least two gripping tips.

13. The implant of claim 1, wherein said distal end further comprises at least two flutes.

14. The implant of claim 1, wherein said apical portion depth is configured to facilitate sinus lifting procedures, wherein said apical portion is configured to have a length of about 0.4 to about 5 mm.

15. The implant of claim 1, wherein said apical portion is configured to assume a shape that is selected from the group consisting of: trapezoidal, ball, curved, ovoid, ellipsoid, pyramid, conical, polygonal having n sides wherein n is at least 2.

16. The implant of claim 1, wherein said apical portion further features micro-threads.

17. The implant of claim 1, wherein the apical surface of said primary thread features a number of apical surface recesses that is equal to the number of start threads.

18. The implant of claim 1, wherein the apical surface of said primary thread features a number of apical surface recesses that is determined based on the number of start threads.

19. The implant of claim 1, wherein the apical surface of said primary thread features at least two apical surface recesses.

20. The implant of claim 1, wherein said apical surface recess is disposed along said apical surface at a distance of up to 0.2 mm from a core of said apical portion.

21. The implant of claim 1, further comprising one or more coronal flutes configured to be cutting flutes.

22. The implant of claim 21, wherein said one or more coronal flutes are configured to be bone cutting flutes.

23. The implant of claim 21, wherein said one or more coronal flute are disposed on any portion of implant body.

24. The implant of claim 22, wherein said one or more coronal flutes may be arranged in any manner along the implant body selected from: linear, curvilinear, helical, clockwise, counterclockwise, intermittent, or any combination thereof.

* * * * *